United States Patent
Bailey et al.

(10) Patent No.: US 9,440,502 B2
(45) Date of Patent: Sep. 13, 2016

(54) WHEEL SENSING ARRANGEMENT, WHEEL SENSOR AND METHOD

(75) Inventors: John Bailey, Great Hockham (GB); Gavin Skipper, Ely (GB); James Shingleton, Norfolk (GB); Kevin Ireland, Norfolk (GB); Martin Oates, Winfarthing (GB)

(73) Assignee: BF1SYSTEMS LIMITED, Norfolk (GB)

( * ) Notice: Subject to any disclaimer, the term of this patent is extended or adjusted under 35 U.S.C. 154(b) by 277 days.

(21) Appl. No.: 13/054,740

(22) PCT Filed: Jul. 17, 2009

(86) PCT No.: PCT/GB2009/050883
§ 371 (c)(1),
(2), (4) Date: Jan. 18, 2011

(87) PCT Pub. No.: WO2010/007445
PCT Pub. Date: Jan. 21, 2010

(65) Prior Publication Data
US 2011/0122399 A1    May 26, 2011

(30) Foreign Application Priority Data

Jul. 18, 2008  (GB) .................................. 0813230
Aug. 14, 2008  (GB) .................................. 0814846

(51) Int. Cl.
| | | |
|---|---|---|
| *G01J 5/00* | (2006.01) | |
| *B60C 23/20* | (2006.01) | |
| *B60C 23/04* | (2006.01) | |
| *B60C 23/06* | (2006.01) | |

(52) U.S. Cl.
CPC ............... *B60C 23/20* (2013.01); *B60C 23/04* (2013.01); *B60C 23/066* (2013.01)

(58) Field of Classification Search
USPC ....................................................... 250/338.1
See application file for complete search history.

(56) References Cited

U.S. PATENT DOCUMENTS

| | | |
|---|---|---|
| 4,150,567 A | 4/1979 | Prevorsek et al. |
| 5,663,496 A | 9/1997 | Handfield et al. |
| 5,708,411 A | 1/1998 | Hill |
| 7,075,421 B1 | 7/2006 | Tuttle |

(Continued)

FOREIGN PATENT DOCUMENTS

| | | |
|---|---|---|
| DE | 43 26 976 | 2/1995 |
| EP | 1 508 790 | 2/2005 |
| GB | 2 236 885 | 4/1991 |
| GB | 2 363 463 | 12/2001 |

(Continued)

OTHER PUBLICATIONS

PCT/GB2009/050883, filed Dec. 23, 2009, International Search Report.

*Primary Examiner* — David Porta
*Assistant Examiner* — Edwin Gunberg
(74) *Attorney, Agent, or Firm* — Workman Nydegger

(57) ABSTRACT

A wheel sensor (4) comprises sensing means for sensing one or more conditions within a pneumatic tire (2) of a wheel (1) and an attachment means configured to secure said sensing means to the wheel rim (3); wherein said sensor (4) further comprises an optical sensor (6) pointing towards the inside surface (12) of said tire (2) for receiving radiation radiated from said inside surface (12); whereby temperature values may be derived representative of said tire surface temperature.

21 Claims, 5 Drawing Sheets

(56) References Cited

U.S. PATENT DOCUMENTS

2004/0233968 A1* 11/2004 Tabata et al. ................ 374/121
2007/0279203 A1   12/2007 Thomas et al.

FOREIGN PATENT DOCUMENTS

JP    2005-212696        8/2005
JP    2005-212696 A  *   8/2005   ............. B60C 23/20

* cited by examiner

A)
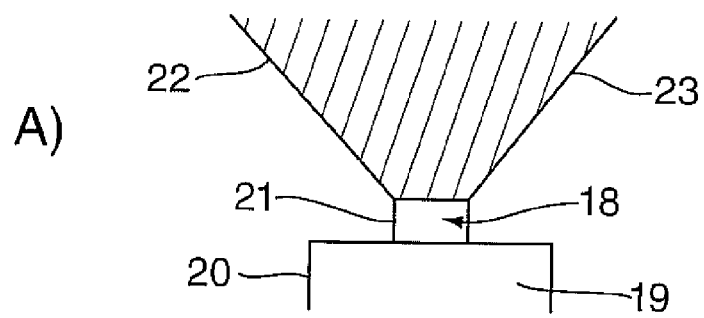
B)
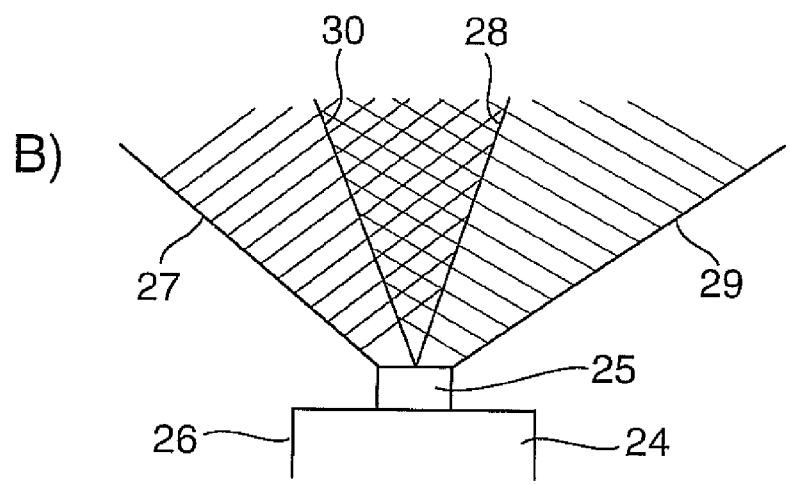
C)
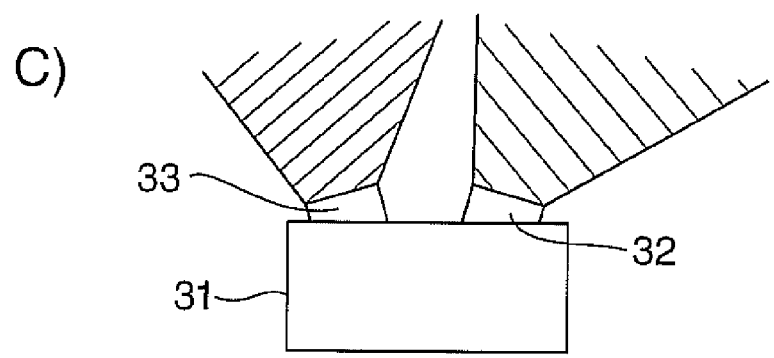
Fig's. 2

WHEEL SENSING ARRANGEMENT, WHEEL SENSOR AND METHOD

FIELD OF THE INVENTION

The invention relates to wheel sensing arrangements, wheel sensors and wheel sensing methods.

BACKGROUND OF THE INVENTION

Numerous wheel sensors are available for sensing the ambient temperature and/or pressures in the ambient pneumatic region of a tyre.

GB2236885 employs an optical sensor in the context of wheel sensing. However, the optical sensor for receiving radiation is located in this prior art document on a stationary part of an associated hub assembly. The component associated with the rim is only an emitter. The combination of infra-red emitter and a sensor operates between the rim of the wheel and the stationary portion of the hub assembly. The optical sensor only receives data once every revolution when the emitter and sensor are in line. The optical sensor neither points towards the inside surface of the tyre nor does it view the inside surface in order to be able to receive radiation radiated from the inside surface.

The following further prior art documents are acknowledged: GB2363463, U.S. Pat. No. 5,708,411, and U.S. Pat. No. 5,663,496.

One object of the invention is to provide a wheel sensor which allows not only the ambient temperature to be measured, but also the surface temperature and in particular, the internal surface temperature of the tyre.

Another object of the invention is to improve the facility to assess the tyre condition during a motor race.

A further object of the invention is to provide a wheel sensor which may be readily integrated with other sensor features such as ambient pressure, and the temperature at the rim.

It is an object of the invention to provide a system which allows data to be gathered which is more closely linked to the evolution of temperature at the tyre surface and which would be less influenced by the rim temperature which is influenced by the heat generated during the braking process.

A further object of the invention is to provide a system which may be readily fitted to a rim without requiring specific rim and/or tyre modifications.

A further object of the invention is to allow a plurality of areas to be assessed independently around the wheel.

SUMMARY OF THE INVENTION

In a first broad independent aspect, the invention provides a wheel sensing arrangement comprising a wheel with a pneumatic tyre and a rim, the tyre and the rim forming a pneumatic chamber, sensing means or a sensor located within said pneumatic chamber for sensing one or more conditions within said pneumatic tyre of a wheel and an attachment means or fastener configured to secure said sensing means or sensor to said wheel rim, wherein said sensor further comprises an optical sensor pointing towards and viewing the inside surface of said tyre for receiving radiation radiated from said inside surface; whereby temperature values may be derived representative of said tyre surface temperature.

This configuration is particularly advantageous because it allows the tyre pressure to be assessed from the inside of the tyre without any contact with the tyre itself. It also allows specific data to be generated, representative of the tyre surface temperature which may be then compared with the ambient tyre temperature and/or the temperature within the vicinity of the rim. It also lends itself to straightforward fitting into existing rims and/or tyres without any specific structural modification being necessary.

In a subsidiary aspect in accordance with the invention's first broad independent aspect, said optical sensor is an infrared sensor. This configuration is particularly advantageous because it allows the sensing to occur in extreme temperatures from, for example, −40° Celsius to 125° Celsius. It also allows for accurate assessments to take place in particular whilst the wheel is in motion.

In a further subsidiary aspect, said sensor is configured to view the inside surface of the tyre corresponding to a tread region, and the inside surface of the tyre corresponding to lateral regions of said tyre. This configuration is particularly advantageous because it allows both the inside surface and the lateral regions to be assessed simultaneously. It may therefore lend itself to identifying potential hot spots across this area.

In a further subsidiary aspect, said sensor is configured to separately view the inside surface of the tyre corresponding to a tread region, and the inside surface of the tyre corresponding to lateral regions of said tyre. This will allow the various portions of a tyre to be assessed separately in order to monitor the evolution of the measured temperature with a separate degree of refinement relative to a given area if necessary.

In a further subsidiary aspect, said sensor is configured to view a single view. This configuration is particularly advantageous because it minimises the amount of views monitored and assessed. It therefore allows the processing speed to be optimised whilst providing a significant advance over only monitoring ambient temperature.

In a further subsidiary aspect, said sensor is configured to view two separate views which overlap in a region corresponding to the inside surface of the tread region. This configuration is particularly advantageous because it allows in effect the field of view to be segmented into three distinct regions. It therefore allows a separate analysis of three regions whilst employing a sensor configured to view only two separate views.

In a further subsidiary aspect, said sensor incorporates a single optical sensor viewing several separate fields of view. In a preferred embodiment, the sensor views 3 separate fields.

In a further subsidiary aspect, said sensor incorporates a unit with a plurality of optical sensors aimed in a plurality of directions. This configuration is also capable of segmenting the assessment per specific area.

In a further subsidiary aspect, the wheel sensor further incorporates ambient in-tyre pressure sensing means. This configuration is also particularly advantageous because it allows the sensing to take into account fluctuations in the ambient in-tyre pressure and to compare them with fluctuations in the tyre surface. It also allows for greater accuracy of the tyre surface assessment.

In a further subsidiary aspect, said sensor further incorporates means for sensing the optical sensor's body temperature. This configuration is particularly advantageous because it allows the assessment to take into account the sensor's body temperature in order to arrive closer to the actual fluctuations in tyre surface temperatures.

In a further subsidiary aspect, said sensor is configured to operate up to 125° Celsius.

In a further subsidiary aspect, said sensor is configured to operate down to −40° Celsius.

In a further subsidiary aspect, the wheel sensor further comprises means for wirelessly transmitting signals representative of sensed characteristics to a receiver. This allows the assessment to occur at a remote location from the sensor.

In a further subsidiary aspect, said sensor incorporates a unit and a temperature sensor for sensing the temperature at or in the vicinity of said wheel sensor which is in addition to said optical sensing means. This configuration is particularly advantageous because it allows the assessment to take into account fluctuations at the wheel sensor itself for a closer monitoring of the surface fluctuations in temperature.

In a further subsidiary aspect, said sensor incorporates a housing and said optical sensor is partly embedded in said housing. This allows the embedded part to be in effect protected from harsh environmental conditions. It also mechanically strengthens the optical sensor.

In a further subsidiary aspect, said sensor is located in a middle region between the edges of a wheel rim. This provides for advantageous balance in the wheel. It also allows the sensor to be fitted in a separate location from the inlet valve. It would therefore allow the inlet valve to be changed independently from the optical wheel sensor.

In a further subsidiary aspect, said wheel further incorporates a plurality of wheel sensors located at spaced apart positions about the circumference of said rim. This allows the entire circumference of said wheel to be assessed in order to identify potential hot spots at various positions about the circumference.

In a second broad independent aspect, the invention provides a wheel sensing method comprising the steps of:
attaching an optical sensor to the rim of a wheel inside the pneumatic region of a tyre;
pointing said optical sensor towards an inner surface of said tyre;
receiving radiation at said optical sensor;
determining signals representative of temperature values at said inner surface; and
wirelessly transmitting signals from said sensor for further processing of said signals.

This method allows the advantages listed above to be present.

In a third broad independent aspect, the invention provides a wheel sensor comprising a housing for holding an optical sensor and an attachment for securing the wheel sensor to a wheel rim, wherein said optical sensor is configured to have one or more widening fields of view to view a portion of the inside of a tyre.

In a subsidiary aspect, said optical sensor is an infrared sensor.

In a further subsidiary aspect, said sensor is configured to view the inside surface of the tyre corresponding to a tread region, and the inside surface of the tyre corresponding to lateral regions of said tyre.

In a further subsidiary aspect, said sensor is configured to separately view the inside surface of the tyre corresponding to a tread region, and the inside surface of the tyre corresponding to lateral regions of said tyre.

In a further subsidiary aspect, said sensor is configured to view a single view.

In a further subsidiary aspect, said sensor is configured to view two separate views which overlap in a region corresponding to the inside surface of the tread region.

In a further subsidiary aspect, said sensor is configured to view a plurality of separate fields of view of the inside surface of the tyre.

In a further subsidiary aspect, said sensor incorporates a unit with a plurality of optical sensors aimed in a plurality of directions.

In a further subsidiary aspect, the sensor further incorporates ambient in-tyre pressure sensing means.

In a further subsidiary aspect, said sensor further incorporates means for sensing the optical sensor's body temperature.

In a further subsidiary aspect, said sensor is configured to operate up to 125 degrees Celsius.

In a further subsidiary aspect, said sensor is configured to operate down to minus 40 degrees Celsius.

In a further subsidiary aspect, said sensor further comprises means for wirelessly transmitting signals representative of sensed characteristics to a receiver.

In a further subsidiary aspect, said sensor incorporates a unit and a temperature sensor for sensing the temperature at or in the vicinity of said wheel sensor which is in addition to said optical sensing means.

In a further subsidiary aspect, said sensor incorporates a housing and said optical sensor is partly embedded in said housing.

In a further subsidiary aspect, said sensor is located in a middle region between the edges of a wheel rim.

In a further subsidiary aspect, said wheel further incorporates a plurality of wheel sensors located at spaced apart positions about the circumference of said rim.

BRIEF DESCRIPTION OF THE FIGURES

FIG. 2A shows a wheel sensor with a single field of view.

FIG. 2B shows a wheel sensor with a dual field of view in accordance with a second embodiment of the invention.

FIG. 2C shows a wheel sensor equipped with two optical sensors pointing in differing directions in accordance with a third embodiment of the invention.

DETAILED DESCRIPTION OF THE FIGURES

Figure 1:
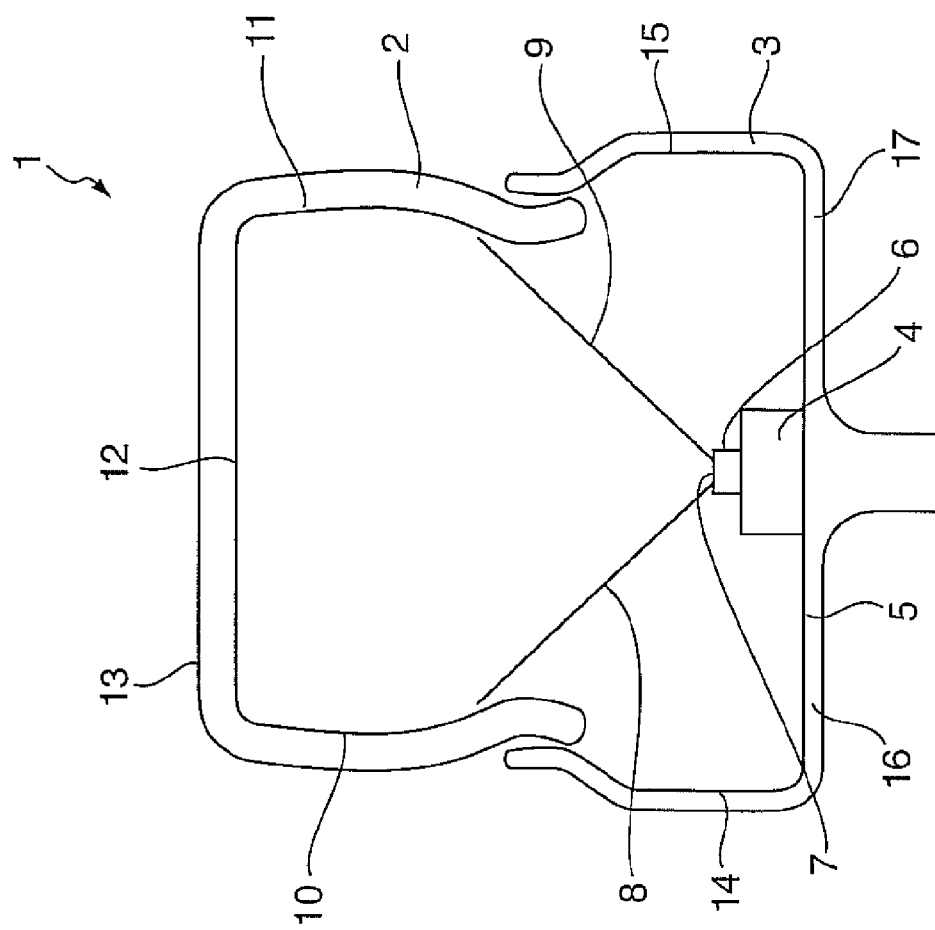
FIG. 1 shows a cross-sectional view of a wheel equipped with a wheel sensor in accordance with a first embodiment of the invention.

FIG. 1 shows a wheel 1 with a tyre 2 located on a rim 3. A wheel sensor 4 is secured to a central portion 5 of rim 3. The wheel sensor incorporates an optical sensor 6 with an upper aperture 7 forming a field of view between lines 8 and 9. The field of view encompasses a first lateral surface 10 and a second lateral surface 11. It also incorporates an inner surface 12 corresponding to the tread region 13 of a tyre. As can be identified, the wheel sensor 4 is located in a position where portions 10, 11 and 12 are collectively in view.

Whilst the location shown in FIG. 1 is particularly advantageous, other potentially advantageous locations are envisaged, such as placing a sensor against upper portion 14 of the rim, on portion 15, on side 16, and/or side 17 of the lower portion 5 of the rim.

A plurality of separate wheel sensors may also be placed in any or all of these positions. In addition, the angle of the field of view may be adjusted dependent upon the area of assessment.

The wheel sensor may also incorporate the following features: ambient pressure sensing means, temperature sensing means for the sensor's own internal temperature, temperature sensing means for the optical sensor body temperature, and a wireless transmitter. The wireless transmitter may be adapted to function with a wireless receiver located in the body of a motor vehicle which may itself incorporate a further wireless transmitter for transmitting sensed data to a base station.

The wheel sensor is preferably an infrared sensor. The materials selected for the wheel sensor may be such that it can withstand harsh environments such as 125° Celsius. In a preferred embodiment, it is envisaged that the wheel sensor withstands temperatures in the range of −40° Celsius to 125° Celsius. The infrared sensor may be a single or dual zone infrared thermometer such as TO-39 supplied by Melexis.

FIG. 2A shows a wheel sensor 19 equipped with an optical sensor 18. Part of the optical sensor is located within the housing 20 of the wheel sensor whilst a protruding part 21 can be seen in the Figure. Schematically, a field of view is illustrated between lines 22 and 23.

FIG. 2B shows a wheel sensor 24 incorporating an optical sensor 25 protruding from the wheel sensor housing 26. The optical sensor is configured for viewing two views. The first view is illustrated between lines 27 and 28 whilst the second view is illustrated between lines 29 and 30. An area of overlap shown by the cross hatching is provided between lines 28 and 30. This configuration allows the optical sensor to segment its view into three effective portions.

FIG. 2C shows a wheel sensor 31 incorporating two partially embedded optical wheel sensors 32 and 33 which point towards two separate areas of a tyre.

Figure 3:
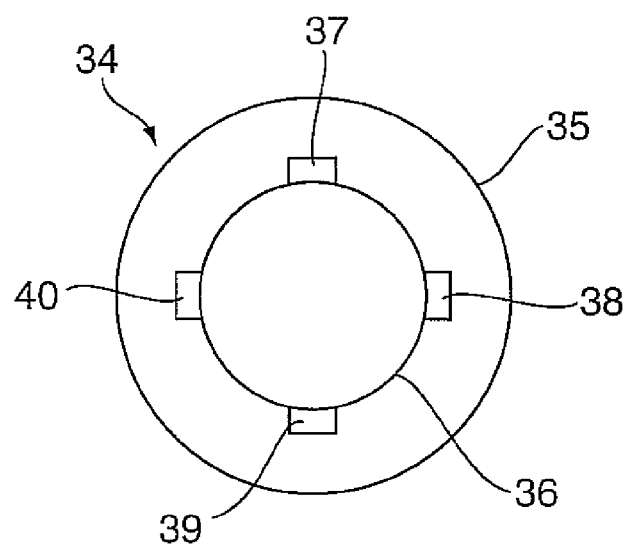
FIG. 3 shows a schematic view of a wheel with a plurality of wheel sensors at different locations about the circumference in accordance with a fourth embodiment of the invention.

FIG. 3 shows a wheel 34 with a tyre 35 and a rim 36. At each quarter position about the circumference of the rim, there is provided a wheel sensor incorporating an optical sensor such as optical sensors 37, 38, 39 and 40. In a further embodiment, two or more sensors are provided about the circumference of the rim. Advantageously, 3 sensors are provided.

In a further embodiment, the optical sensor may be pointing towards a rim portion to assess the rim temperature.

Figure 4:
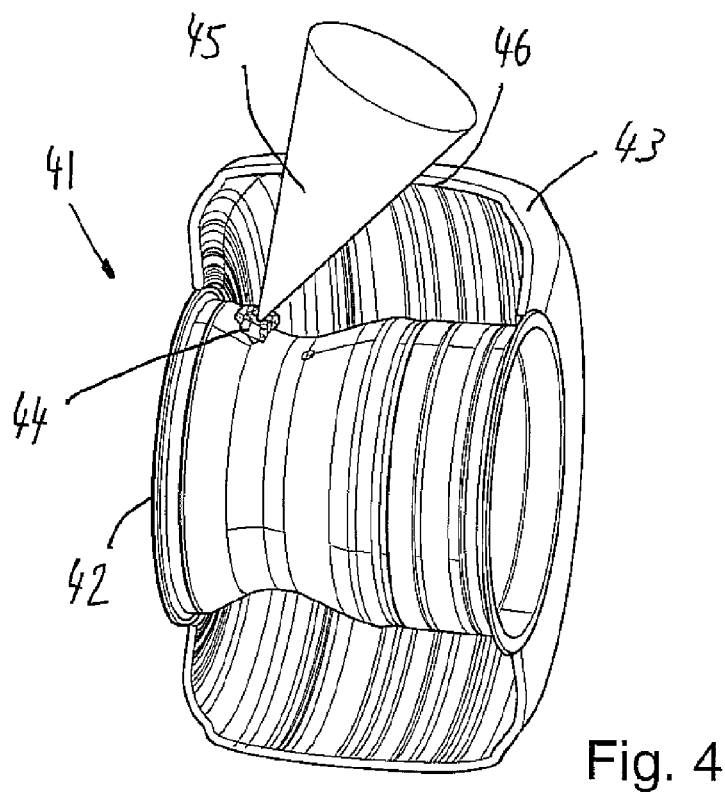
FIG. 4 shows a part cross-sectional view of a wheel sensing arrangement where the sensor housing is valve mounted.

FIG. 4 shows a wheel sensing arrangement 41 with a rim 42 and a tyre 43. A sensor housing 44 fastens to the valve inlet. The optical sensor has a progressively widening field of view illustrated by conical section 45. The optical sensor images onto the inside surface 46 of the tyre. The direction of the view of the sensor may be perpendicular to the top surface of the sensor. However, in other embodiments it may be offset in order to allow the positioning of the sensor to one side of the rim whilst allowing the sensor to view the main section of the tread of the tyre.

Figure 5:
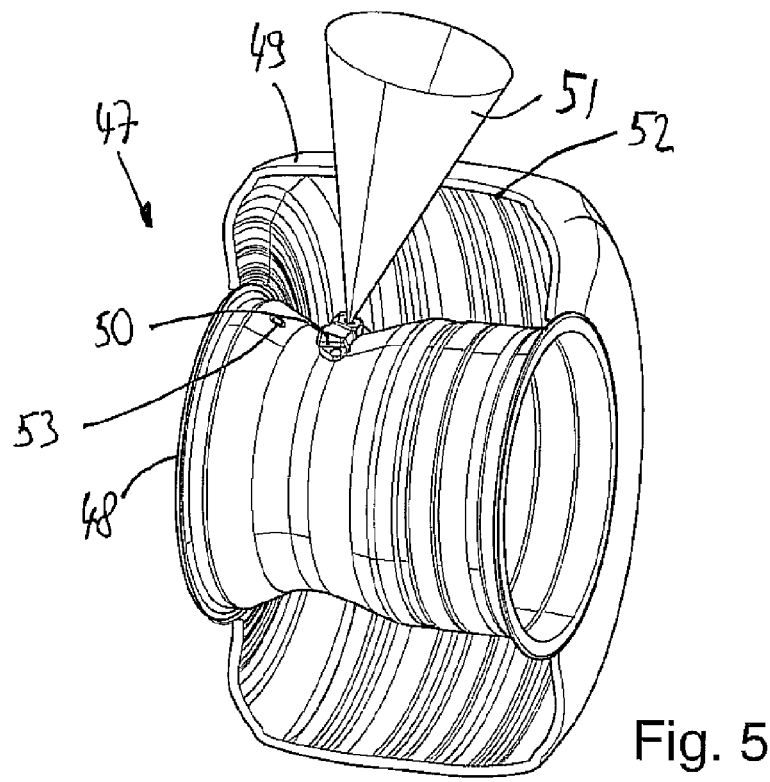
FIG. 5 shows a part cross-sectional view of a wheel sensing arrangement with the sensor housing attached to the rim at a lowermost portion of the rim.

FIG. 5 shows an optical wheel sensing arrangement 47 with a rim 48 and a tyre 49. Sensor housing 50 is attached in the portion of the rim which has a relatively narrow diameter. The sensor has a field of view 51 illustrated by a conical shape. The field of view obviously stops at the inner surface 52 of the tyre. The sensor may be configured to view directly above the sensor or be relatively offset to view a central portion of the tread portion of the inside of the tyre. In the configuration of FIG. 5, the housing is secured to a portion other than the valve. In order to achieve this, appropriate fastening means may be employed which may interact with a separate hole in the rim. The valve inlet is shown as reference 53.

Figure 6:
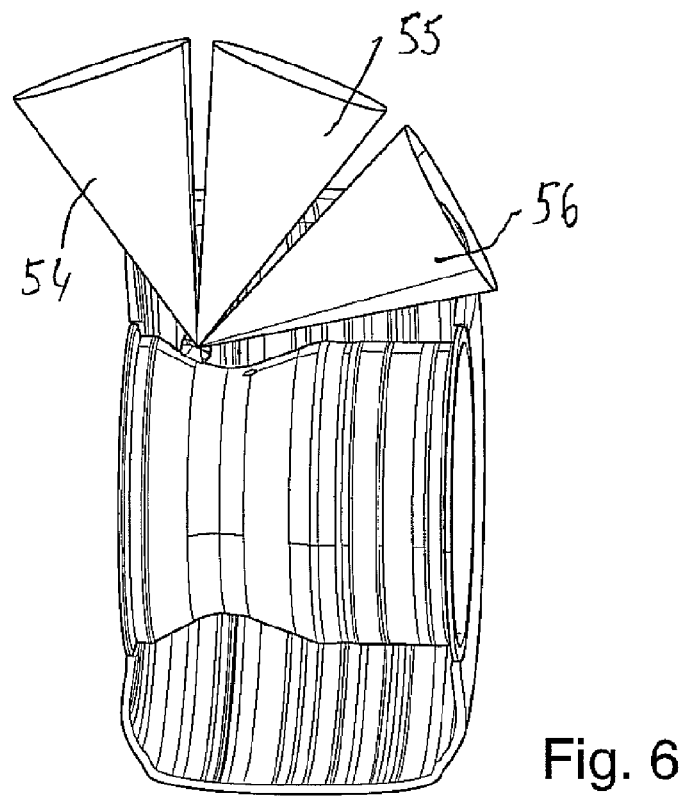
FIG. 6 shows a part cross-sectional view of a valve mounted sensor housing with an optical sensor with three separate views.
Figure 7:
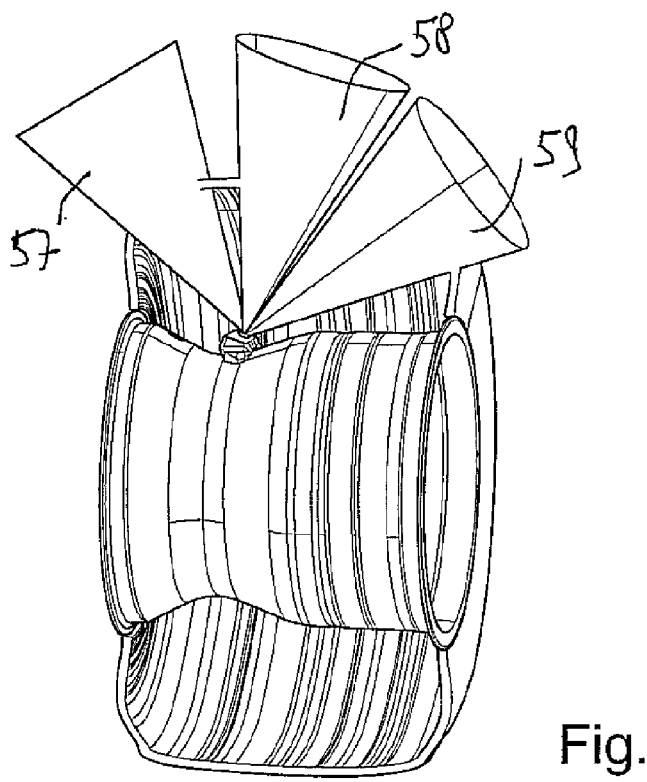
FIG. 7 shows the wheel sensing arrangement with a rim mounted sensor housing with the three separate views of the inside of a tyre.

FIG. 6 and FIG. 7 both illustrate embodiments of the kind shown in FIGS. 4 and 5 but where the field of view is composed of three separate conical shapes referenced respectively 54, 55 and 56 for the embodiment of FIGS. 6 and 57, 58 and 59 for the embodiment of FIG. 7. FIG. 6 shows a sensor which is valve mounted whilst FIG. 7 shows a sensor which is mounted at a distinct location from the valve.

The invention claimed is:

1. A wheel sensing arrangement comprising:
a wheel with a pneumatic tire and a rim, the tire and the rim forming a pneumatic chamber; said rim having an offset recessed portion which is offset relative to the center of said rim;
a sensor unit located within said pneumatic chamber for sensing a plurality of conditions within said pneumatic tire of said wheel; and
a fastener configured to secure said sensor unit to said wheel rim;
wherein said sensor unit comprises a housing and an optical infrared sensor having a progressively widening conical field of view defining a circular zone on an inside surface of the tire;
whereby temperature values may be derived from said sensor unit that are representative of a surface temperature of said tire;
wherein said optical infrared sensor comprises a body and a sensor for sensing temperature of said body in addition to a temperature in the vicinity of said body and an ambient in tire pressure;
wherein said body of said optical infrared sensor is at least partly embedded in said housing and the angle of the field of view of said infrared sensor is configurable from viewing directly above said sensor to a relatively offset viewing angle;
wherein when said sensor is secured in said offset recessed portion to said rim, said sensor views a central portion of the tread portion of the inside surface of the tire.

2. The wheel sensing arrangement according to claim 1, wherein said optical sensor comprises a single sensor which is configured to simultaneously view the inside surface of the tire corresponding to a tread region, and the inside surface of the tire corresponding to lateral regions of said tire.

3. The wheel sensing arrangement according to claim 1, wherein said optical infrared sensor is configured to separately view the inside surface of the tire corresponding to a tread region, and the inside surface of the tire corresponding to lateral regions of said tire.

4. The wheel sensing arrangement according to claim 1, wherein said optical infrared sensor is configured to view a single view.

5. The wheel sensing arrangement according to claim 1, wherein said optical infrared sensor is configured to view two separate views which overlap in a region corresponding to the inside surface of the tread region.

6. The wheel sensing arrangement according to claim 1, wherein said sensor unit comprises a plurality of optical infrared sensors aimed in a plurality of directions.

7. The wheel sensing arrangement according to claim 1, wherein said optical infrared sensor is configured to operate up to 125 degrees Celsius.

8. The wheel sensing arrangement according to claim 1, wherein said optical infrared sensor is configured to operate down to minus 40 degrees Celsius.

9. The wheel sensing arrangement according to claim 1, further comprising a transmitter for wirelessly transmitting signals representative of sensed characteristics to a receiver.

10. The wheel sensing arrangement according to claim 1, further comprising a plurality of sensor units located at spaced apart positions about a circumference of said rim.

11. A wheel sensing method comprising the steps of:
attaching an optical sensor unit comprising a housing and an optical infrared sensor to a rim of a wheel inside a pneumatic region of a tire, said rim having an offset recessed portion which is offset relative to the center of said rim, said optical infrared sensor comprising a body and a sensor, said body of said optical infrared sensor being at least partially embedded in said housing of said optical sensor unit;
securing said sensor unit in said offset recessed portion to said rim;
configuring said sensor from viewing directly above said sensor to a relatively offset viewing angle; whereby said sensor views a central portion of the tread portion of the inside surface of the tire from said offset recessed portion;
pointing said optical infrared sensor towards an inner surface of said tire; said optical infrared sensor having a progressively widening conical field of view defining a circular zone on the inner surface of the tire;
receiving radiation at said optical infrared sensor;
determining signals representative of temperature values at said inner surface of said tire;
sensing a temperature of the body of said optical infrared sensor in addition to a temperature in the vicinity of the body and an ambient in-tire pressure; and
wirelessly transmitting signals from said optical infrared sensor for further processing of said signals.

12. A wheel sensor unit comprising:
a housing holding an optical infrared sensor; and
a fastener for securing the optical infrared sensor to a wheel rim, wherein said optical infrared sensor has a progressively widening conical field of view defining a circular zone when activated against an inside surface of a tire;
wherein the angle of said field of view of said infrared sensor is; configurable from viewing directly above said sensor to a relatively offset viewing angle; whereby when said sensor is secured in an offset recessed portion to a rim, said sensor views a central portion of the tread portion of an inside surface of the tire; and
wherein said optical infrared sensor comprises a body and a sensor for sensing a temperature of the body in addition to a temperature in the vicinity of said body, and a ambient in-tire pressure.

13. The wheel sensor according to claim 12, wherein said optical infrared sensor is configured to simultaneously view an inside surface of a tire corresponding to a tread region, and an inside surface of the tire corresponding to lateral regions of said tire.

14. The wheel sensor according to claim 12, wherein said optical infrared sensor is configured to separately view an inside surface of a tire corresponding to a tread region, and an inside surface of the tire corresponding to lateral regions of said tire.

15. The wheel sensor according to claim 12, wherein said optical infrared sensor is configured to view a single view.

16. The wheel sensor according to claim 12, wherein said optical infrared sensor is configured to view two separate views which overlap in a region corresponding to an inside surface of a tread region of a tire.

17. The wheel sensor according to claim 12, further comprising a plurality of optical infrared sensors aimed in a plurality of directions.

18. The wheel sensor according to claim 12, wherein said optical infrared sensor is configured to operate up to 125 degrees Celsius.

19. The wheel sensor according to claim 12, wherein said optical infrared sensor is configured to operate down to minus 40 degrees Celsius.

20. The wheel sensor according to claim 12, further comprising a transmitter for wirelessly transmitting signals representative of sensed characteristics to a receiver.

21. A wheel sensing arrangement comprising:
a wheel comprising a rim and a tire mounted thereon; and
a plurality of wheel sensor units according to claim 12, the plurality of wheel sensor units being located at spaced apart positions about a circumference of the rim.

\* \* \* \* \*